United States Patent
Heinonen

(10) Patent No.: US 6,925,568 B1
(45) Date of Patent: Aug. 2, 2005

(54) METHOD AND SYSTEM FOR THE PROCESSING OF MESSAGES IN A TELECOMMUNICATION SYSTEM

(75) Inventor: Petteri Heinonen, Espoo (FI)

(73) Assignee: Sonera Oyj, Helsinki (FI)

(*) Notice: Subject to any disclaimer, the term of this patent is extended or adjusted under 35 U.S.C. 154(b) by 853 days.

(21) Appl. No.: 09/615,087

(22) Filed: Jul. 12, 2000

Related U.S. Application Data

(63) Continuation of application No. PCT/FI99/00019, filed on Jan. 13, 1999.

(30) Foreign Application Priority Data

Jan. 16, 1998 (FI) .................................................. 980085

(51) Int. Cl.$^7$ ............................ G06F 12/14; H04L 9/12; H04Q 7/18; H04Q 7/32
(52) U.S. Cl. ..................... 713/193; 380/247; 455/412.1; 455/466; 713/163
(58) Field of Search .................... 455/412, 412.1, 455/412.2, 466; 380/247; 713/163, 193; 370/349

(56) References Cited

U.S. PATENT DOCUMENTS

| | | | |
|---|---|---|---|
| 5,301,234 A | | 4/1994 | Mazziotto et al. |
| 5,404,580 A | | 4/1995 | Simpson et al. |
| 5,457,680 A | * | 10/1995 | Kamm et al. ................ 370/332 |
| 5,544,246 A | | 8/1996 | Mandelbaum et al. |
| 5,557,679 A | * | 9/1996 | Julin et al. .................... 380/249 |
| 5,590,133 A | | 12/1996 | Billström et al. |
| 5,646,985 A | * | 7/1997 | Andruska et al. ......... 379/265.1 |
| 5,687,216 A | * | 11/1997 | Svensson .................. 455/412.2 |
| 5,748,720 A | | 5/1998 | Loder |
| 6,067,529 A | * | 5/2000 | Ray et al. ....................... 705/26 |
| 6,075,860 A | * | 6/2000 | Ketcham ..................... 713/159 |
| 6,085,099 A | * | 7/2000 | Ritter et al. ................. 455/466 |
| 6,363,151 B1 | * | 3/2002 | Linder .......................... 380/247 |
| 6,510,515 B1 | * | 1/2003 | Raith ........................... 713/163 |
| 6,556,835 B1 | * | 4/2003 | Raivisto ...................... 455/466 |
| 6,580,906 B2 | * | 6/2003 | Bilgic et al. .............. 455/422.1 |

FOREIGN PATENT DOCUMENTS

| | | | |
|---|---|---|---|
| EP | 0 841 770 | 5/1998 | |
| WO | WO 95/01684 | 1/1995 | |
| WO | WO 96/32700 | 10/1996 | |
| WO | WO 97/45814 | 12/1997 | |
| WO | WO 98/37663 | 8/1998 | |
| WO | WO 9856201 A2 | * 12/1998 | ............ H04Q/7/32 |

* cited by examiner

Primary Examiner—Gregory Morse
Assistant Examiner—Matthew Heneghan
(74) Attorney, Agent, or Firm—Cohen, Pontani, Lieberman & Pavane

(57) ABSTRACT

A method and system for encrypting, in a telecommunication system, outgoing message traffic between mobile stations operating in accordance with current mobile communication standards and/or between a mobile station and a service provider, and for decrypting incoming message traffic, includes directing encrypted messages to and receiving encrypted messages from only those members of a limited closed receiver group that are located in a given geographic area.

19 Claims, 4 Drawing Sheets

METHOD AND SYSTEM FOR THE PROCESSING OF MESSAGES IN A TELECOMMUNICATION SYSTEM

This is a continuation of PCT Application No. PCT/FI99/00019, filed on Jan. 13, 1999, which claims priority from Finland Application No. FI 980085, filed Jan. 16, 1998

BACKGROUND OF THE INVENTION

1. Field of the Invention

The present invention relates to telecommunication technology and, in particular, to a method and system for encryption and decryption of short messages and for authentication of the sender in a telecommunication system.

2. Description of Related Art

Telecommunication networks, as for example GSM (Global System for Mobile communications) networks, utilize heavy encryption of speech transmission in the radio link between a mobile station and the base station serving the mobile station. In addition to voice communication, the use of text messages for effecting communication via mobile stations has significantly increased. Moreover, with the rise of service standards, services based on text communication have become common. Such text communication can be utilized for and in connection with a wide variety of service functions, as in effecting payment for services. One current obstacle to easy encryption of messages is the fact that mobile stations consistent with and utilizing current mobile communication standards do not permit changes that would facilitate encryption. Indeed, at present the only component of conventional mobile stations that is sufficiently standardized and allows encryption is the subscriber identity module (SIM).

Mobile telephones consistent with current mobile communication standards, such as the GSM standard, do not directly provide the ability or possibility of using encryption in text communication by and between mobile stations. Thus, although text communication can be used to implement services requiring a high level of data security, services requiring such high levels of data security cannot become common before sufficient encryption of messages is available.

Currently known are closed user group solutions in mobile communication networks that are, for example, implemented on the basis of the mobile telephone numbers of the mobile devices or stations. In these applications, a message is delivered separately to each person included in a distribution list without respect to each recipient's location. A considerable drawback to this system is that the message delivery time varies considerably between the first and last persons on the distribution list.

One serious existing problem with message communication under current mobile communication standards is that it is possible for a third party to read the contents of a text message. A further problem is the lack of a practical way to encrypt the messages relating to different services so that the receiver can ascertain the identity of the sender. Still another difficulty is encountered in the sending of encrypted messages to a closed receiver group in a given or predetermined geographic area.

OBJECTS AND SUMMARY OF THE INVENTION

It is accordingly the desideratum of the present invention to eliminate or, at the very least, significantly alleviate the drawbacks and deficiencies of prior art methods and systems, as for example hereinabove described.

It is a specific object of the invention to provide a new type of method and system for encrypting the outgoing message traffic between mobile stations, and/or between a mobile station and a service provider, consistent with current mobile communication standards, and for decrypting the incoming message traffic.

It is a further object of the invention to provide such a method and system for allowing the transmission and receipt of encrypted messages in or to or among and within a closed receiver group in a given geographic area.

In the inventive method for encrypting a message and/or authenticating the sender of a message in a telecommunication network of or in a telecommunication system, the transmission software comprises the applications and parameters of the encryption algorithm that is being used. The message may for example be an SMS (Short Message Service) message consistent with a known or existing mobile communication standard, such as the GSM protocol.

In accordance with the invention, using a mobile station messages are generated and sent to and are received by or through the message switching center of the telecommunication system, and the applications and parameters needed by the encryption and/or decryption algorithm employed are stored on the subscriber identity module of the mobile station. Also stored on the subscriber identity module is the message that has been or is to be encrypted and/or the message that has been or is to be decrypted. It is in accordance with the invention possible, by way of example, to use as the encryption algorithm an RSA or like or corresponding algorithm that provides a high level of data security, the function of which is obvious to the person of skill in the art.

In the inventive system, a telecommunication system preferably comprises a telecommunication network, a mobile station connected to the network and having an associated subscriber identity module, a message switching center, transmission software connected to the message switching center, and a service provider connected to the transmission software. A preferred example of a mobile communication system is a GSM-based system.

In accordance with the inventive system, a given or predetermined memory location in the subscriber identity module is monitored, and the encryption and decryption of a message, such as a message stored on the subscriber identity module, is started on the basis of or in response to a predetermined string that is stored in the given memory location. The memory location may for example be an ADN (Abbreviated Dialing Number) memory location. Encryption of messages stored in the subscriber identity module may by way of illustrative example be initiated if and when "Name: bank" and "No.: 1235" is determined to be stored or present in the ADN memory location. An encryption algorithm stored on the subscriber identity module performs the encrypting of messages and returns the decrypted messages to the SMS memory locations after the mobile station has been restarted. The string that is used to activate encryption and/or decryption can be automatically removed or deleted from the predetermined memory location of the subscriber identity module automatically, as after encryption or decryption has been completed.

In this manner, an effective manner of security features and functionality is implemented and achieved. The string activating encryption and/or decryption will not be inadvertently or unintendedly left in the ADN memory location.

Messages stored and received on the subscriber identity module can also be encrypted or decrypted automatically—i.e. without the need for manual user intervention or action.

In accordance with the invention, transmission of an encrypted message mayn be effected to only members of a closed user group who are located in a predetermined geographic area. Decryption will be possible only if the receiver has the encryption key required for decryption of the message. As a transmission means, the Cell Broadcast (CB) feature of the mobile communication standard may for example be employed. When a message is to be sent, a geographic or other or like area to which the message is to be delivered is defined. Since the message is transmitted to of the intended receivers using areal mobile communication technology, all users will receive the message simultaneously. If a member of the closed receiver group is absent from the specified area, then the information will not be transmitted to that particular user of the group. The invention may for example be applied to the development of a regular customer concept in applications in which given or desired information is to be made available only or exclusively to a desired group.

In further accordance with the invention, the user of a mobile station can send a service request in the form of a message. The transmission software obtains the required information from the service provider and calls an encryption and/or decryption routine, which encrypts and/or decrypts the message received from the service provider and sends the encrypted and/or decrypted message to the message switching center and, from there, on to the recipient mobile station.

The inventive system includes means for monitoring a given or predetermined memory location in the subscriber identity module and means for initiating encryption of a message and/or decryption of an encrypted message on the basis of a predetermined string stored in the given memory location of the subscriber identity module.

The inventive system preferably includes means for automatically removing the encryption and/or decryption activating string from the subscriber identity module, as when encryption or decryption of the message(s) has been completed. The system may further include means for transmitting a message to only those members of a closed user group who are located in a given area; the recipient user group preferably carries or has means for decrypting the encrypted message.

In accordance with the invention, the transmission software includes or comprises means for calling an encrypting and/or decrypting routine for the respective encryption and/or decryption of a message held or received from a service provider, and means for further sending an encrypted and/or decrypted message to the message switching center and, from there, further to a destination or intended recipient mobile station.

The subscriber identity module preferably includes or comprises means for automatically encrypting and decrypting messages either stored on the subscriber identity module or received by the mobile station and/or subscriber identity module.

The invention also provides a novel and improved subscriber identity module (SIM). The inventive SIM comprises a data processing device, a storage device connected to the data processing device, and a data transfer device connected to the data processing device, and is further provided with an interface for data transfer between the mobile station and the subscriber identity module. The SIM additionally includes, in accordance with the invention, means for monitoring a given memory location and means for activating the encryption of a message and/or decryption of an encrypted message on the basis of, or triggered by, the presence of a predetermined string that is stored in the given memory location in the subscriber identity module.

As compared with the prior art, the present invention advantageously allows digital signing of messages as well as their encryption and decryption, thus rendering it possible to reliably identify the sender of a message. In addition, the invention permits a plurality of users to be substantially simultaneously reached in a predetermined geographic area without unduly loading the network. Thus, the members of a closed user group only receive relevant information relating to the time and geographic area in question. A further advantage of the present invention is that the messages sent between a service provider and a mobile station can be encrypted while, at the same time, the authenticity of the information is ascertained.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the following, wherein like reference characters denote similar elements throughout the several Figures.

DETAILED DESCRIPTION OF THE CURRENTLY PREFERRED EMBODIMENTS

Figure 1:
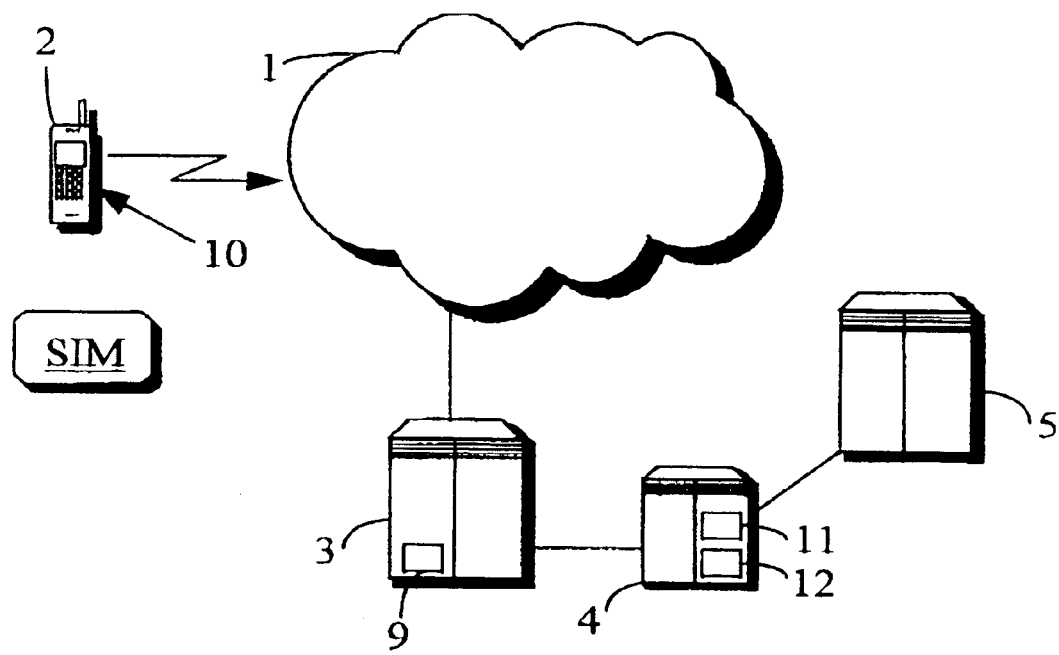
FIG. 1 schematically depicts a telecommunication system in accordance with a preferred embodiment of the present invention.

The telecommunication system shown in FIG. 1 comprises a telecommunication network 1 featuring a Short Message Service (SMS) functionality consistent with current or otherwise known or utilized mobile communication standards. Other types of messages and messaging services, such as USSD (UnStructured Service Data), can also be used. Moreover, Wireless Application Protocol (WAP) messaging can be utilized in lieu of SMS messages. The telecommunication network is preferably a GSM network although other mobile communication networks, such as UMTS (Universal Mobile Telecommunication Standard) networks, may also be used. In any event, connected or connectable to the mobile communication network 1 is a mobile station 2 with a subscriber identity module SIM connected thereto. Also connected to the mobile communication network 1 is a message switching center 3, which may for example be a Short Message Service Center (SM-SC) in a GSM system. The message switching center 3 includes means 9 for transmitting a message exclusively to members of a closed user group in a predetermined geographic or other area, in accordance with the present invention.

Connected to or also included in or forming a part of the message switching center 3 is transmission software 4 which comprises means 11 for calling an encrypting and/or decrypting routine for the processing of a message received from a content or service provider 5. Transmission software 4 further includes means 12 for further sending or forwarding an encrypted and/or decrypted message to the switching center 3 and, from there, to the destination mobile station 2. The telecommunication network additionally includes or is connected to a content or service provider 5, as by way of illustrative example a bank.

Figure 2:
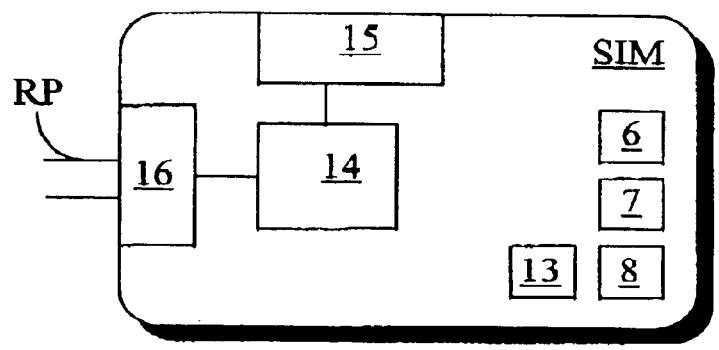
FIG. 2 diagrammatically depicts a subscriber identity module in accordance with the invention.

A preferred subscriber identity module (SIM) in accordance with the invention is shown in FIG. 2. The SIM includes a data processing device 14, a storage device 15 connected to data processing device 14, and a data transfer device 16 also connected to data processing device 14, and is further provided with an interface RP for data transfer between the mobile station 2 and the SIM.

The subscriber identity module SIM preferably includes, in further accordance with the invention, means 6 for monitoring a given or predetermined memory location in the SIM and means 7 for activating or initiating the encryption and/or decryption of a message on the basis or instance of the presence of a predetermined string that is determined, through such monitoring, to be stored in the predetermined memory location. In addition, the SIM comprises means 8 for automatically removing therefrom (i.e. from the predetermined memory location) the string that is used to activate or initiate encryption and/or decryption, and means 13 for automatically encrypting and decrypting messages stored on and received by the subscriber identity module.

The various means 6–16 shown in FIGS. 1 and 2 may be implemented in any known or otherwise convenient or appropriate manner, and no specific description of any particular implementations thereof is deemed necessary or included herein. For example, some or all of the devices and functionality of the SIM, such as that hereinabove described, may be implemented in whole or in part in software stored on and executable from the SIM.

Figure 3:
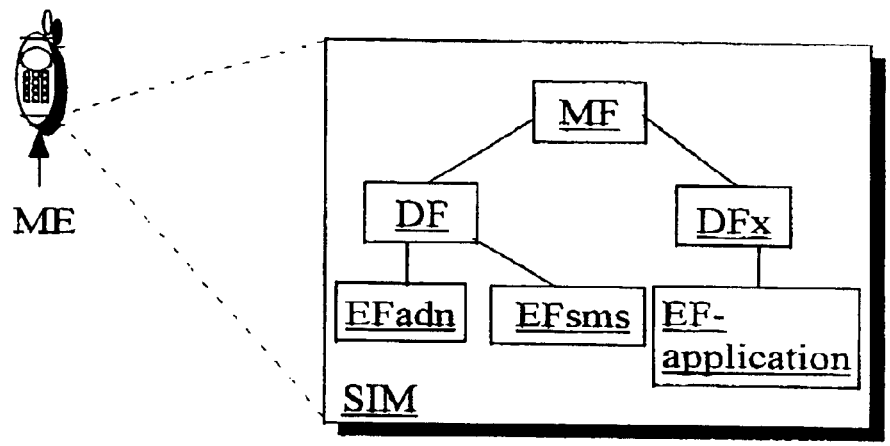
FIG. 3 diagrammatically depicts a software-based view of the subscriber identity module of the invention.

With reference now to FIG. 3, which diagrammatically depicts a software-based view of the subscriber identity module, the SIM is shown connected to a terminal which, in this example and by way of typical illustration, is a mobile station ME consistent with or operable in accordance with the GSM standard. An application program in the DFx directory expects that a predetermined string code is or will be stored in a given location in the EFadn file. When this occurs, the EF application program loads the short messages contained in the EFsms file in the DF directory and processes them in the desired or predetermined manner. The program then returns the processed short messages to the EFsms file. In an advantageous aspect of the invention, all communications between the mobile station ME and the subscriber identity module SIM are consistent with the GSM standard.

Figure 4:
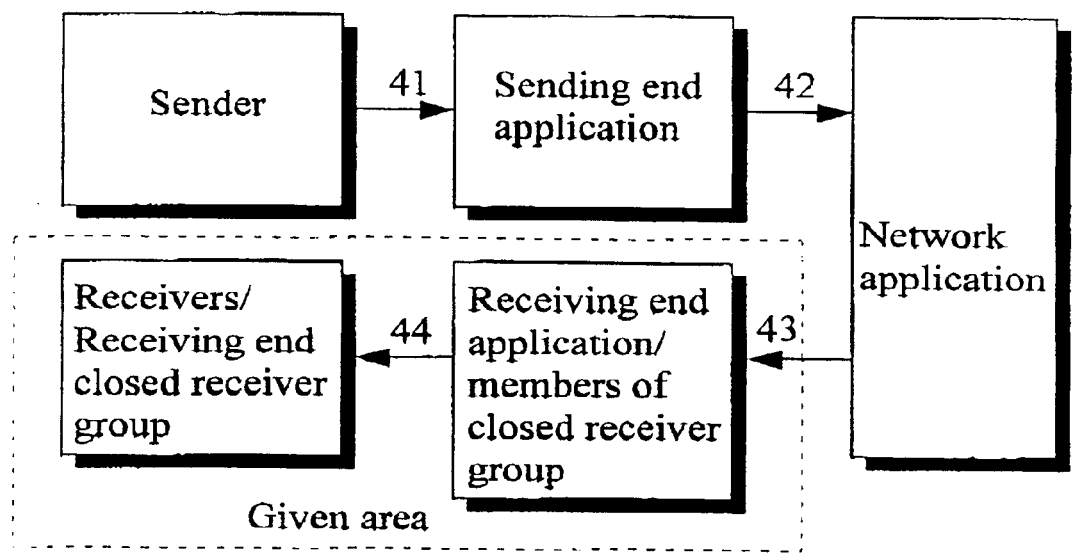
FIG. 4 is a flow chart utilizing a system for areal message transmission.

The system utilized in connection with the flow chart of FIG. 4 comprises a sender, a sending end application and a network application, as well as a receiving end application and a closed user group. "Sender", as used in this context, is intended to denote a person and/or apparatus and/or application which sends the messages in accordance with the invention. The message may by way of example be an SMS or USSD message. Each of the sending and receiving end applications are a functional entity which contains both the physical apparatus and the associated application software. In this illustrative example, the physical apparatus comprises a mobile telephone, a subscriber identity module connected to the mobile telephone and, optionally, a parallel subscriber identity module such as an intelligent card external to the GSM system. The application software is located in the mobile telephone and/or in the subscriber identity module and/or in the parallel subscriber identity module, or in a system communicating with one or more of them. For example, the application software may be distributed between the various parts of the physical apparatus.

The term "areal receiver", as used herein, denotes a person and/or apparatus and/or application which receives areal messages in accordance with the invention. To receive such messages, mobile users in the area require a sufficient hardware and software assembly, which will typically include a physical apparatus and the associated application software. The principle and operation generally corresponds to that of the sending end application, although there may be some differences in the physical structures and assemblies and the functional properties.

The network application is a functional entity that communicates with the sending end application. The term "network application" may refer to service bases containing the physical apparatus and software, and may for example comprise a Short Message Service center or a Cell Broadcast service center and/or systems and interfaces and the like connected thereto. The main functions of the network application include the receiving of messages from the sending end application, routing of the received messages to the switching centers which manage areal message transmission, and sending of the messages to the receivers in a given or predetermined area. In an alternative implementation, the transmission of messages can be carried out using other than wireless technology; for example, the messages may be transferred to the network application using data networks such as TCP/IP (Transmission Control Protocol/Internet Protocol) or X.25 protocol networks.

The procedure for areal transmission is now described with reference to FIG. 4.

The sender first enters a message, selects a closed user group as the intended recipient or receiver and indicates to the sending application that he wishes to send a message (step 41). The sending end application encrypts the message using its encryption key and sends the message (at step 42) to the network application. The network application then transmits the message (step 43) to the closed user group; transmission of the message by the network is effected transparently without regard to its content or to the encryption that has been used therewith. Finally, the encrypted message is decrypted by the receiving end applications (step 44) of the various members of the closed user group in the designated area who have received the message. The receiving or recipient members of the closed user group can each then read the message in unencrypted, plain-language form.

Figure 5:
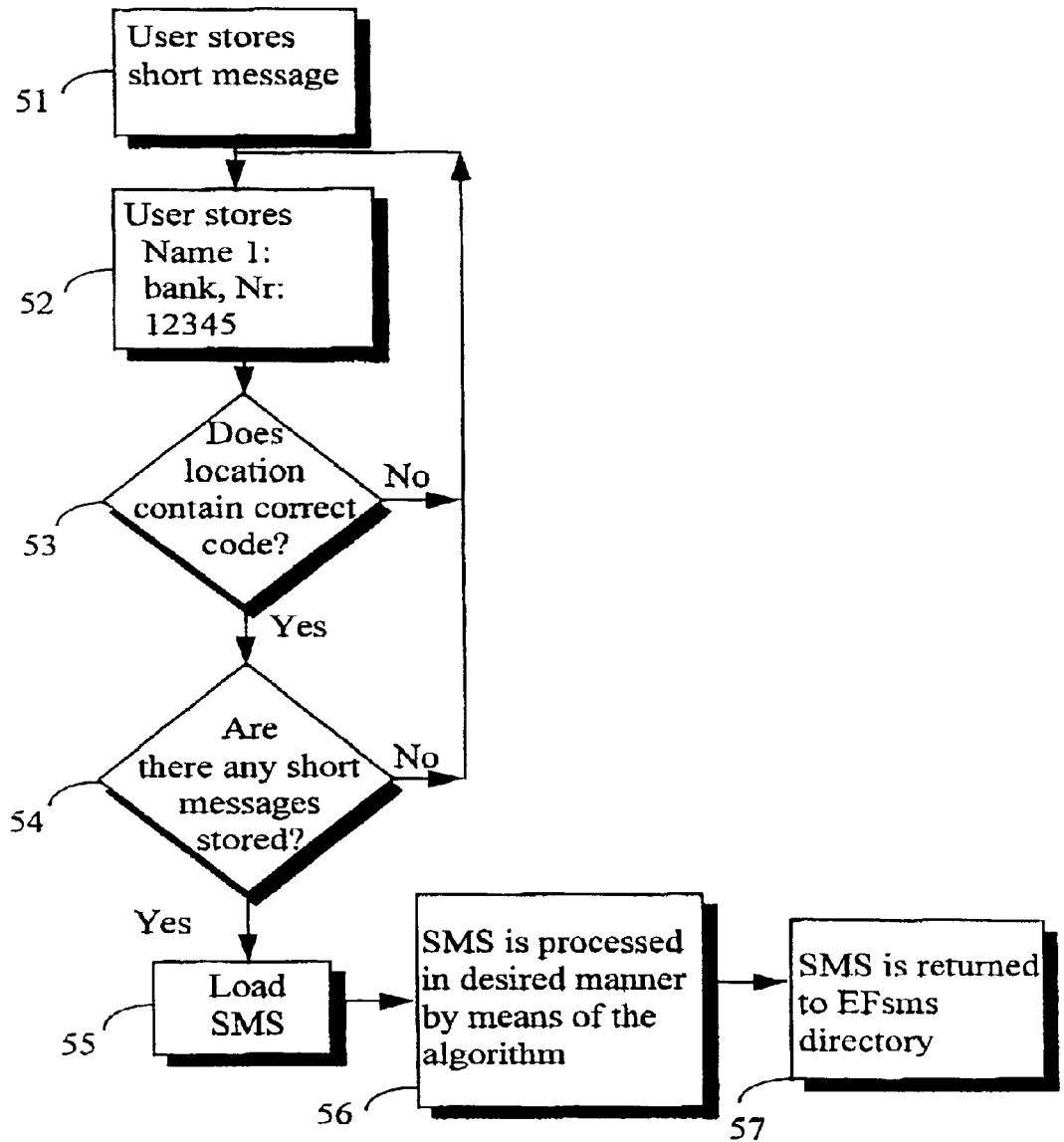
FIG. 5 is a flow chart for a method of message encryption.

FIG. 5 illustrates the procedure used to encrypt a message, as for example an SMS message. At block 51, the user stores a short message or short messages to be sent on the subscriber identity module. Then, at block 52, the user enters in the Name field of a memory location a predetermined string referring to or denoting an encryption or decryption operation. In the FIG. 5 illustrated example, the string is "bank". In the Number field, the user enters "12345". Theses strings function as the factor or trigger or instruction that initiates encryption or decryption.

At the next block 53, the system determines whether the strings stored in the memory location require or instruct the encryption or decryption of messages. If not, then operation is returned to block 52. If, on the other hand, the stored string functions as an activator of encryption or decryption, then the procedure goes on to block 54, at which a check is made to determine whether there are currently any messages awaiting encryption or decryption on the subscriber identity module. If not, then operation is returned to block 52. If messages to be processed are present on the subscriber identity module, then these messages are loaded (block 55) and, at block 56, the stored message(s) are processed in the desired manner using the required algorithm. For encryption, an RSA algorithm or other like or corresponding or otherwise suitable algorithm creating a high level of data security can be employed. Finally, as indicated at block 57, the encrypted or decrypted message is returned to an EFsms file.

Figure 6:
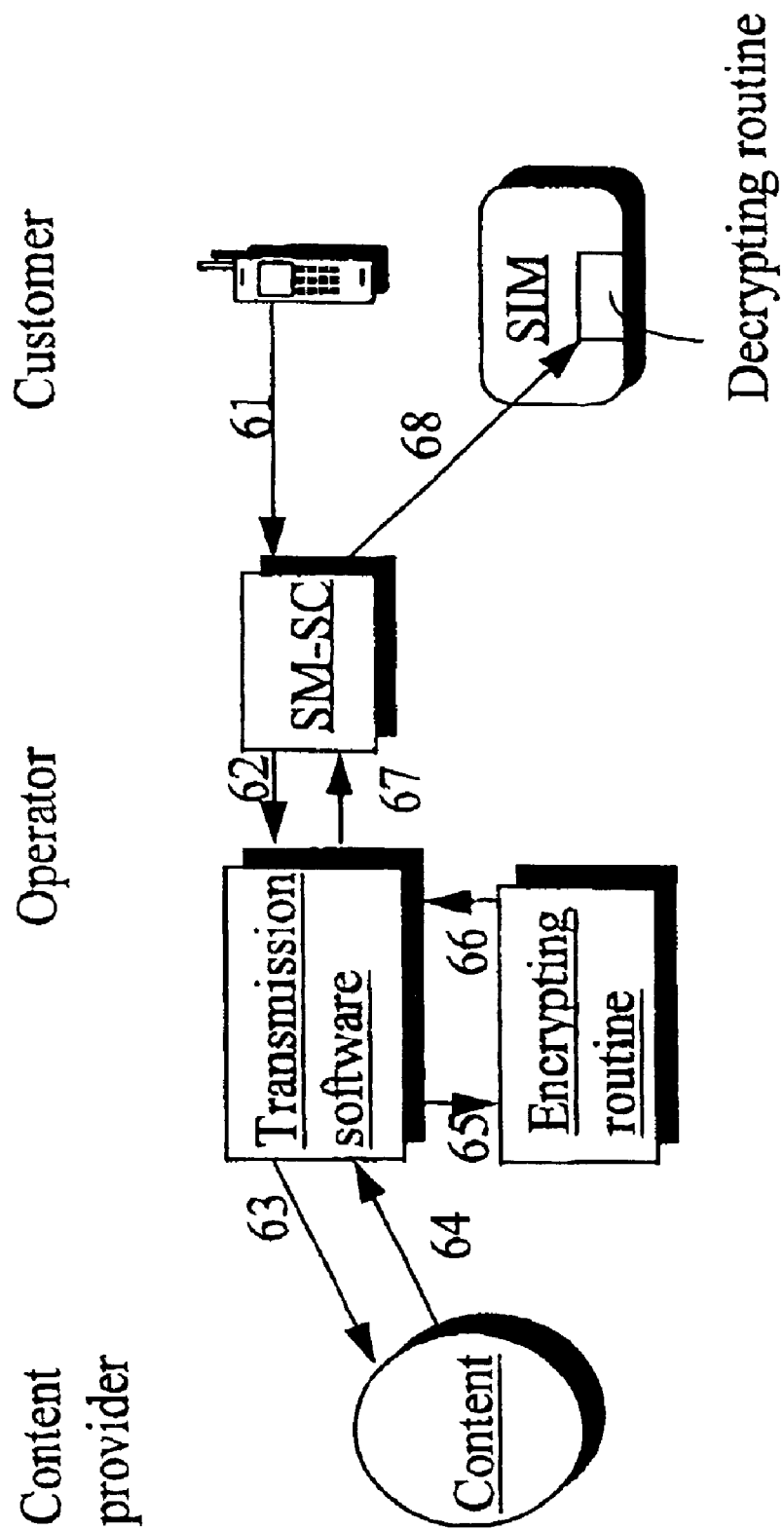
FIG. 6 is a block diagram illustrating message encryption between a mobile user customer and a content or service provider.

Illustrated in FIG. 6 is the progress of a message when a service request in the form of a message is sent from a mobile station to a service provider. A customer sends (at 61) a request for the transmission of information to the mobile station user. The SM-SC further transmits (at 62) the request to the transmission software. The transmission software converts the request into a form understandable to the service provider and transmits it (at 63) to the service provider. The service provider sends (at 64) the information that it has produced back to the transmission software which (at 65) calls the encryption routine. The encryption routine encrypts the information (at 66) by using an agreed-upon private key associated with the service provider and then transmits (at 67) the encrypted message to the SM-SC switching center using a number associated with the private key as the sending telephone number. The encryption algorithm may be part of the transmission software, or it may be located in a separate functional unit, as for example a server. In any event, the SM-SC then transmits (at 68) the message to the mobile user. The message is identified as proceeding or emanating from a telephone number recognized as reliable, and messages received from this number are decrypted by using a public key associated with that particular telephone number. Finally, the mobile station displays the message in a way that permits the user to ascertain its authenticity, as for example by presenting the query "Message received from N. Read?". As should be apparent, the foregoing example may also readily be applied to two-way communication instead of the one-way implementation hereinabove described.

Thus, while there have shown and described and pointed out fundamental novel features of the invention as applied to preferred embodiments thereof, it will be understood that various omissions and substitutions and changes in the form and details of the methods and devices illustrated and described, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. In a method of encryption and decryption of messages in a telecommunication system that includes a telecommunication network, a message switching center connected to the telecommunication network for directing messages through the telecommunication system, a service provider, transmission software connecting the message switching center to the service provider, a subscriber's mobile station connected to the telecommunication network and from which messages are generated and are sent and received via the message switching center, and a subscriber identity module connected to the mobile station for storing on the subscriber identity module a message to be one of encrypted and decrypted and applications and parameters for encryption and decryption of the stored message, the improvement comprising the steps of:

monitoring a predetermined memory location of the subscriber identity module for presence at said memory location of a predetermined string, and initiating, in response to monitored detection of the predetermined string at said memory location, one of encryption and decryption of the message stored on the subscriber identity module.

2. In the method of claim 1, further comprising the step of automatically removing the predetermined string from the predetermined memory location of the subscriber identity module upon completion of the one of encryption and decryption of the message stored on the subscriber identity module.

3. In the method of claim 1, further comprising the step of defining a closed user group of users of the telecommunication system and a user group-specific decryption key for the closed user group, each of the users of the closed user group having a mobile station connected to the telecommunication system and a subscriber identity module connected to the mobile station of the each user.

4. In the method of claim 3, further comprising the step of transmitting a message from the subscriber's mobile station to only the users of the closed user group located in a predetermined geographic area.

5. In the method of claim 4, wherein said transmitting of the message is effected using Cell Broadcast.

6. In the method of claim 1, further comprising the steps of:

processing, by the transmission software, a message received by the transmission software from the service provider by calling one of an encryption routine and a decryption routine for one of encryption and decryption of the received message; and sending, from the transmission software to the message switching center, the processed message for further transmission from the message switching center to the mobile station.

7. In the method of claim 1, wherein the messages are short messages consistent with a mobile communication standard.

8. In the method of claim 1, wherein the predetermined memory location comprises an Abbreviated Dialing Number memory location.

9. In the method of claim 1, wherein storage and encryption and decryption of messages on the subscriber identity module are effected automatically.

10. In a system for encryption and decryption of messages in a telecommunication system that includes a telecommunication network, a message switching center connected to the telecommunication network for directing messages through the telecommunication system, a service provider, transmission software connecting the message switching center to the service provider, a mobile station connected to the telecommunication network and from which messages are generated and are sent and received via the message switching center, and a subscriber identity module connected to the mobile station for storing on the subscriber identity module a message to be one of encrypted and decrypted and applications and parameters for encryption and decryption of the stored message, the improvement comprising:

means on the subscriber identity module for monitoring a predetermined memory location of the subscriber identity module for presence at said memory location of a predetermined string; and means on the subscriber identity module for initiating, in response to monitored detection of the predetermined string at said predetermined memory location, one of encryption and decryption of a message stored on the subscriber identity module.

11. In the system of claim 10, further comprising means on the subscriber identity module for automatically removing the predetermined string from the predetermined memory location of the subscriber identity module upon completion of the one of encryption and decryption of the message stored on the subscriber identity module.

12. In the system of claim 10, further comprising means for transmitting a message exclusively to members of a closed user group located in a predetermined geographic area.

13. In the system of claim 12, further comprising user group-specific means for decrypting and encrypted message.

14. In the system of claim 10, wherein the transmission software comprises:

means for processing a message received by the transmission software from the service provider by calling one of an encryption routine and a decryption routine for one of encryption and decryption of the received message; and means for sending, from the transmission software to the message switching center, the processed message for further transmission from the message switching center to the mobile station.

15. In the system of claim 10, further comprising means on the subscriber identity module for automatically encrypting and decrypting messages stored on the subscriber identity module.

16. In a subscriber identity module for use in conjunction with a mobile telecommunication station and which includes a data processing device, a storage device connected to the data processing device, a data transfer device connected to the data processing device, and an interface for transfer of information between the mobile station and the subscriber identity module, the improvement comprising:

means for monitoring a predetermined memory location of the subscriber identity module for presence at said memory location of a predetermined string; and means for initiating, in response to monitored detection of the predetermined string at the predetermined memory location, one of encryption and decryption of a message.

17. In the subscriber identity module of claim 16, further comprising means for automatically removing the predetermined string from the predetermined memory location of the subscriber identity module upon completion of the one of encryption and decryption of the message.

18. In the subscriber identity module of claim 16, further comprising means for automatic encryption and decryption of a message stored on the subscriber identity module.

19. In the subscriber identity module of claim 16, further comprising means for automatic encryption and decryption of messages stored on the subscriber identity module and of messages received by the mobile station.

* * * * *